Oct. 12, 1948. J. R. MARTIN ET AL 2,451,036
SPECIFIC GRAVITY RECORDER
Filed Sept. 30, 1944 3 Sheets-Sheet 1

John R. Martin
Forrest B. Burrell INVENTORS.
BY
P. J. Whelan
ATTORNEY.

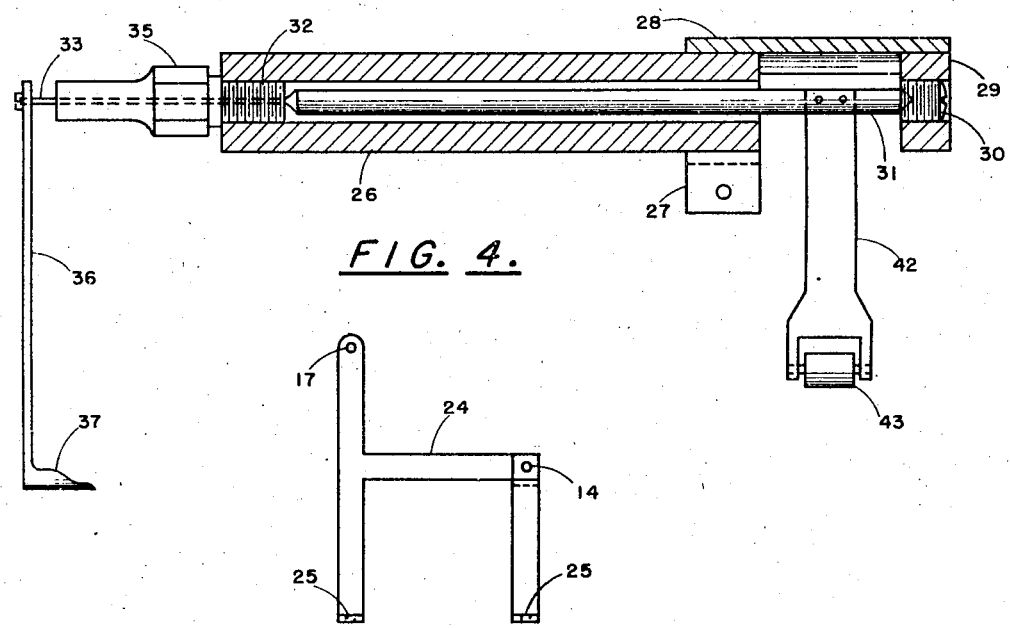
FIG. 4.
FIG. 3.
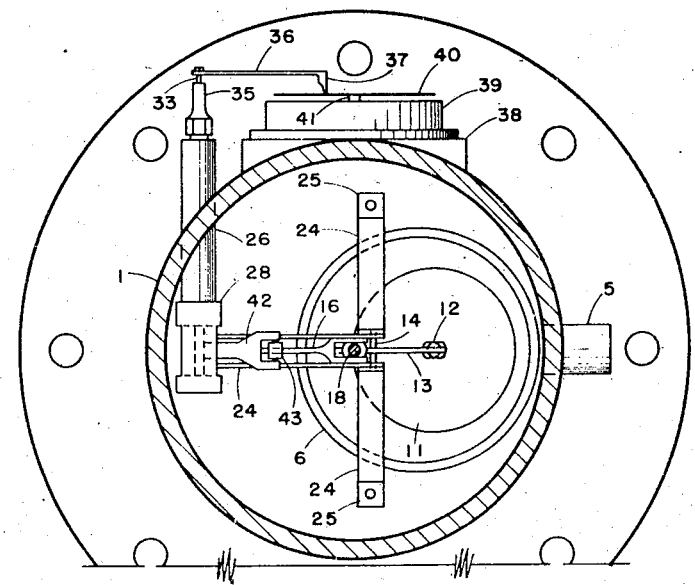
FIG. 2.

Oct. 12, 1948.  J. R. MARTIN ET AL  2,451,036
SPECIFIC GRAVITY RECORDER
Filed Sept. 30, 1944  3 Sheets-Sheet 3

John R. Martin INVENTORS.
Forrest B. Burrell
BY
P. J. Whelan
ATTORNEY.

Patented Oct. 12, 1948

2,451,036

UNITED STATES PATENT OFFICE 2,451,036

SPECIFIC GRAVITY RECORDER

John R. Martin and Forrest B. Burrell, Baytown, Tex., assignors to Standard Oil Development Company, a corporation of Delaware Application September 30, 1944, Serial No. 556,534

7 Claims. (Cl. 73—33)

The present invention is directed to a device for indicating or recording the specific gravity of a moving stream of liquid.

In the handling of flowing liquids, it is frequently desirable for control purposes or distribution purposes to have a continuous record or indication of the specific gravity of the liquid as it exists in the flowing stream without withdrawing a sample. The usual method for determining specific gravity comprises withdrawing a sample from the stream of interest and then, by means of suitable hydrometers or other instruments, determining its weight in relation to an equal volume of water. In certain refinery operations where relatively heavy hydrocarbons are mixed with liquefied normally gaseous hydrocarbons, such as propane, it is difficult to determine the specific gravity of the mixture by usual methods and it is necessary to resort to time-consuming expensive operations.

The periodic determination of specific gravity generally is of little or no value as far as indicating this property of a liquid undergoing processing, especially in dealing with liquids at temperatures and pressures which materially differ from atmospheric conditions. More particularly, the usual methods of determining the specific gravity of mixtures are not suitable or applicable to mixtures that are rapidly undergoing a physical or chemical change since the withdrawn sample materially differs from the sample at the instant of its withdrawal. Likewise, the liquid in its flowing state may comprise a mixture of vapors and liquids in which case the analysis of a withdrawn sample would fail to indicate the specific gravity obtaining under the conditions during the processing operations. For these and other reasons, it is highly desirable to employ an apparatus which is capable of indicating or recording the specific gravity of a liquid undergoing processing under the temperature and pressure conditions encountered in the processing operation. A continuous indication or record of the specific gravity of a fluid under actual operating conditions serves as a valuable means for controlling particular operations.

An object of the present invention is to provide an apparatus for continuously indicating or recording the specific gravity of a flowing stream of liquid under the conditions obtaining in the stream. An additional object of the present invention is to provide an apparatus which will accurately and rapidly indicate and record the changes in specific gravity of flowing liquid that is undergoing definite processing operations, particularly such liquids as may contain dissolved gases. A further object of the present invention is the provision of apparatus of the type described including a system of levers so arranged that the moving parts are protected from the action of the liquid, the specific gravity of which is being indicated or recorded.

Another object of the present invention is the provision of a device of the character described in which are disposed two bodies of liquid the one being the liquid under observation and the other being a non-corrosive, non-fouling liquid immiscible with the liquid under observation which may be referred to as a sealing liquid and in which the moving parts of the apparatus are immersed in the sealing liquid.

Further objects and advantages of the present invention will appear from the following detailed description of the accompanying drawing in which Fig. 1 is a vertical section through one embodiment of the present invention;

Fig. 2 is a horizontal section along line XY of Fig. 1;

Fig. 3 is a detail of a supporting bracket included in the device of Fig. 1;

Fig. 4 is a detail of the shaft for transmitting motion from the interior to the exterior of the vessel shown in Fig. 1; and, Fig. 5 is a vertical section of a modification of the embodiment shown in Fig. 1.

Figure 1:
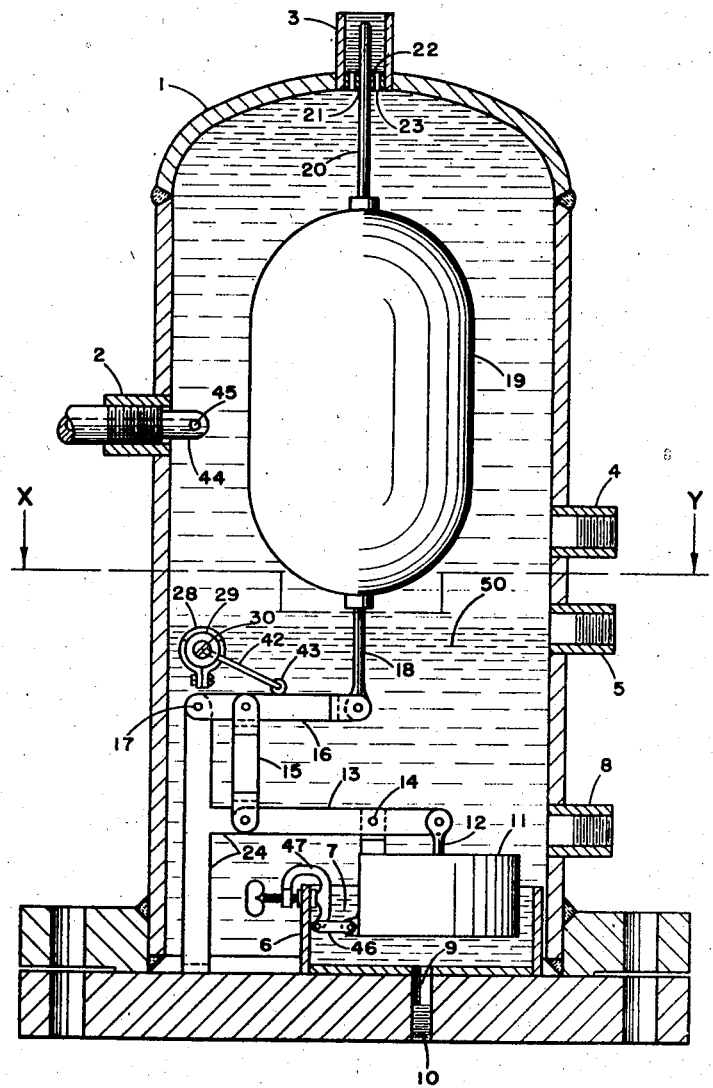

Referring to the drawing in detail, numeral 1 designates a vessel of any desired size and configuration constructed of materials of appropriate chemical and physical resistance to handle the liquid to be studied under the conditions under which said liquid exists.

At a point intermediate its center and its upper end, the vessel is provided with an inlet 2 for the stream of liquid, the specific gravity of which is to be measured. At the upper end of the vessel is an outlet 3 for the stream of liquid. A second outlet 4 for said stream is provided on the side of the vessel at a point below the inlet point. At a suitably spaced point below outlet 4 there is arranged another outlet 5 which is positioned to define the interface between the liquid of the flowing stream and a sealing liquid hereinafter more specifically referred to.

At the bottom of vessel 1 there is fixed an open topped receptacle 6. This receptacle is filled to a suitable height with a body of reference liquid 7 which may suitably be mercury, although other liquids immiscible with the sealing liquid may be employed. For the purpose of introducing this reference liquid into receptacle 6 there is provided in the wall of vessel 1 an inlet 8 conveniently arranged to permit the insertion of a tube for conducting liquid from the exterior of vessel 1 into the receptacle. The bottom of the receptacle is provided with an opening 9 which extends through the bottom of the vessel 1 and is provided with threads 10 to receive a plug. This opening permits the draining of the receptacle.

Partially immersed in the reference liquid 7 is a float 11 having rigidly attached to its upper surface a vertical stem 12. This stem is pivoted at its upper end to a lever 13 which is mounted on a fulcrum 14 in such a way as to rotate about the fulcrum but to be capable of no other movement relative to the fulcrum.

To the other end of lever 13 is pivoted one end of a link 15, the other end of which is pivoted to an intermediate point of a lever 16, one end of which is fixed for rotation about fulcrum 17 and the other end of which is pivoted to a vertical stem 18 fixed to the bottom of a float 19. To the upper end of float 19 is fixed another vertical stem 20 which passes through and is guided in a central opening 21 of a disc 22 screw threadedly engaged in the outlet 3, said disc being provided with a series of passages 23 to permit the passage of the liquid.

The float 19 is so arranged that in its lowermost position its bottom will be above the interface between the flowing stream of liquid and the sealing liquid. The sealing liquid may be any liquid which is immiscible with the liquid in the flowing stream and which will not foul or corrode the moving parts of the lever system. As heretofore mentioned, it must also be immiscible with the reference liquid 7. It may be introduced into the system, as required, with the test liquid in so far as it does not emulsify with the latter under the conditions of flow. A separate inlet for this liquid may be provided, if desired. The use of this sealing liquid is of a special advantage in the handling of asphaltic oils in the gravity recorder because these oils tend to deposit asphalt in gummy material on the joints of the lever system introducing errors. It is also of great importance when the liquid stream, the gravity of which is being measured, is corrosive to common metals. For the handling of such a liquid only the float 19 and its stems 18 and 20 need be composed of usually more expensive resistant metals and the remainder of the moving system immersed in the sealing liquid may be composed of cheaper materials.

Fixed to the bottom of the vessel 1 are a pair of brackets 24. Each of these brackets in side view has the form of an h, as shown in Fig. 3, and a top view has the shape of a letter L, as shown in Fig. 2. At the lower end of each leg of the h is a tongue 25 provided with a hole to receive a bolt or rivet for fastening the bracket to the bottom of the vessel 1. These brackets are oppositely disposed to each other with their long legs in parallel to and in alignment with each other. The bottoms of the small legs are fixed to the bottom of the vessel 1 on either side of the receptacle 6 so that the upper ends of the small legs overlie said receptacle. The upper ends of the small legs are provided with holes in which are journalled a pin constituting fulcrum 14. The upper ends of the long legs are also each provided with a hole to receive a pin constituting fulcrum 17.

Extending chordially through the wall of the vessel 1 is a cylindrical barrel 26 having its axis perpendicular to the plane of the h-shaped brackets. The inner end of said barrel, as shown in Fig. 4, has clamped to it by clamping member 27 an extension arm 28 of which the clamp 27 is an integral part. The outer end of the extension arm carries a block 29 provided with a bearing screw 30 at its center to receive one end of a pintle 31 which extends axially to the other end of a cylinder 26 where it is journalled in a second bearing screw 32. The pintle 31 has formed integrally with it a small diameter shaft 33 which extends through the bearing screw 32, which is also a sealing plug, beyond the end of cylinder 26. The outer end of the plug 32 is provided with a packing gland 35. Fixed to the outer end of the shaft 33 is an indicating or recording arm 36 carrying at its free end a stylus 37.

As shown in Fig. 2, there is welded to the side of the vessel 1 a flat base 38 to which is fixed a case 39 containing clock work which operates a chart 40 fixed to a stub shaft 41 protruding through the case 39. The stylus 37 is arranged to move on the chart 40 in the manner commonly known in recorders of this type. Usually the chart will be calibrated to produce in conjunction with the stylus a record of variation in gravity with time.

Fixed to the pintle 31 between the inner end of cylinder 26 and the block 29 is a metal arm 42 carrying at its free end a roller 43. This arm is mounted so as to lie with its longitudinal axis in the same plane as that of lever 16 with the roller 43 riding on the lever 16. Thus, arm 42 moves in response to movements of lever 16 about its fulcrum 17 and this motion is imparted to the pintle 31 and thus to the recorder.

In order to prevent to the maximum extent turbulent flow around the float 19 and the buoying of float 19 by stream velocity, the inlet port 2 is provided with an inlet nozzle 44 which is blocked off on its inner end and is provided with oppositely disposed openings 45 on its horizontal axis. This arrangement results in the impartation to the incoming liquid of a tangential direction of flow. This particular type of inlet is advantageous when the specific gravities of liquids having a high velocity of flow are being measured. In some cases it may be advantageous to arrange suitable baffles in the upper end of vessel 1 to insure uniform mixing of the liquid in this portion of the vessel.

In order to impart additional stability to the movement of the float 11, there may be provided a link 46 pivoted to a clamp 47 fixed to the edge of receptacle 6 and also pivoted to float 11. In the event the pivoted link 46 is employed, its pivot point on the clamp 47 should, preferably, be vertically in line with fulcrum 14, in order to prevent the application of side thrust to float 11. Alternatively, suitable guides may be provided for float 11. In the ordinary case, however, such stabilizing means is not required.

From the foregoing description it will be understood that the reference liquid 7 provides a liquid of substantially constant density with which the density of the liquid under test may be compared; hence the specific gravity of the liquid under test relative to the reference liquid can be measured and the specific gravity relative to any other liquid can be determined. It will be understood, also, that the reference liquid 7 and float 11 partially submerged therein provide a reference force to counterbalance the force developed by changes in buoyancy of float 19 in the liquid whose specific gravity is to be measured. It will be seen that lever 13 and link 15 cooperate to apply the reference force in opposition to the force developed by float 19. Thus, when float 19 moves upwardly, as when a liquid of high specific gravity relative to the lower range of the instrument is introduced into chamber 1, stem 18 rises and, through the operation of lever 16, link 15 and lever 13, causes float 11 to be forced downward into reference liquid 7. Since the density of reference liquid 7 remains constant, the buoyancy of float 11 in liquid 7 does not change and, accordingly, the forced immersion of the float sets up a force which reacts through the afore-mentioned levers and link to counteract, at least in part, the upward movement of float 19. Similarly, when float 19 tends to move downwardly, lever 13 tends to raise float 11 out of normal immersion in reference liquid 7 again setting up a counterbalancing force.

The embodiment of the present invention thus far described is useful in the measurement of specific gravity of flowing liquids which are lighter than the sealing liquid. A typical instance of such an operation is the measurement of the specific gravity of hydrocarbon streams in a refinery. A suitable sealing liquid for use in conjunction with hydrocarbons is ethylene glycol. Other non-aqueous liquids which are immiscible with oil may be employed and water itself may be employed if the moving parts are made of non-rusting alloy.

Figure 5:
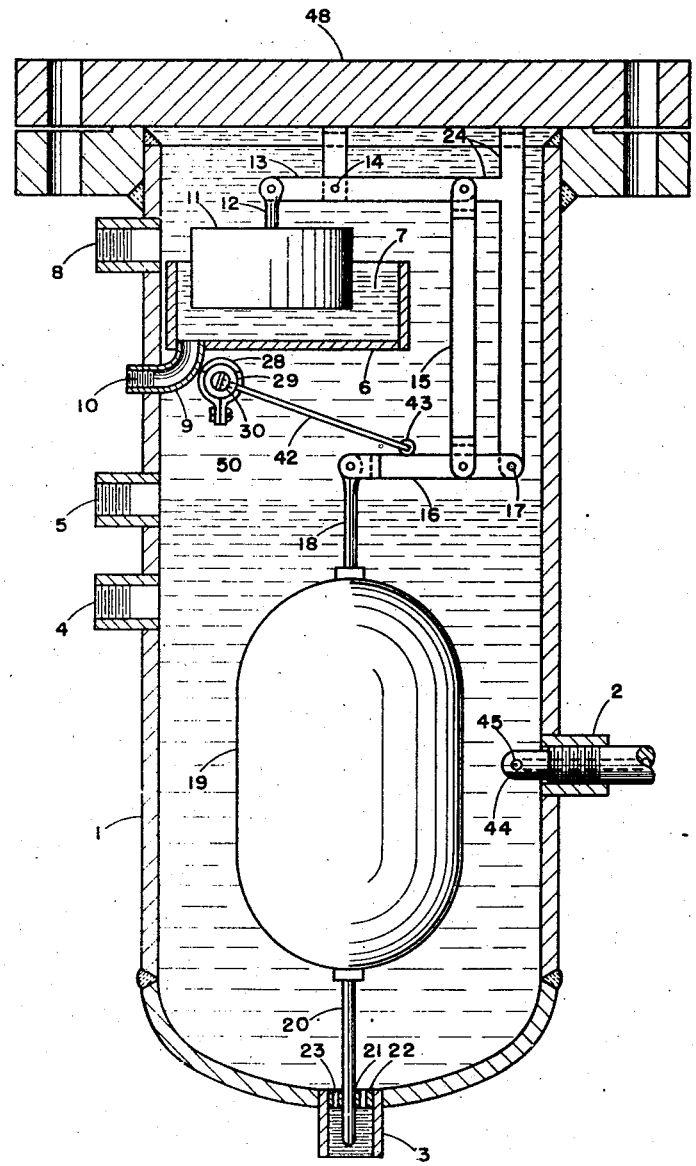

In Fig. 5 is shown a modification which may be employed when the specific gravity of the liquid in the flowing stream is greater than that of the sealing liquid. Here, for example, the liquid in the flowing stream may be an aqueous solution in which case the sealing liquid 50 may be any suitable hydrocarbon such as kerosene. In general, in this modification the position of the parts shown in Fig. 1 is simply reversed. Parts in Fig. 5 corresponding with parts in Fig. 1 bear the same numerals. The mountings for the moving parts are brackets similar to those shown in Fig. 1 attached to the cover 48 of the vessel. Alternatively, suitable brackets can be affixed to the wall of vessel 1 itself for the support of the various moving parts in the lever system, as well as for the support of receptacle 6. The operation of this modification is believed to be evident from the described operation of the embodiment shown in Fig. 1 without the need for further detailed description. With reference to Fig. 1 the following calculations demonstrate the manner in which the proportions of the various elements of the system enter into the response of the system to changes in gravity in the flowing liquid under observation and may serve as a guide to the design and calibration of such a system. In making these calculations the following assumptions are made:

1. The friction of the bearings is zero.
2. The weight of the lever linkage is zero.
3. The temperature within the instrument remains constant.
4. The reference liquid is, for purposes of example, mercury.
5. The mercury float and the mercury chamber are both considered to be cylindrical.

The following symbols are used throughout the computations:

$a$ = the distance, in feet, from the center of fixed fulcrum 17 to the center of the pivot between 16 and 18 (see drawing).

$b$ = the distance, in feet, from the center of fixed fulcrum 17 to the center of the pivot between link 15 and lever 16.

$c$ = the distance, in feet, from the center of fixed fulcrum 14 to the center of the pivot between link 15 and lever 13.

$d$ = the distance, in feet, from the center of fixed fulcrum 14 to the center of the pivot between lever 13 and stem 12.

$D$ = the outside diameter, in feet, of the mercury float 11.

$D_1$ = the inside diameter, in feet, of the mercury chamber 6.

$F_1$ = the upward force, in pounds, exerted on the lever linkage by the measuring float 19 when the latter is submerged in a liquid of density $G_1$.

$F_2$ = the resultant downward force, in pounds, exerted on the mercury float 11 when $F_1$ is exerted by the measuring float 19.

$F_3$ = the upward force, in pounds, exerted on the lever linkage by the measuring float 19 when the latter is submerged in a liquid of density $G_2$.

$F_4$ = the resultant downward force, in pounds, exerted on the mercury float 11 when $F_3$ is exerted by the measuring float 19.

$G_1$ = the density, in pounds per cubic foot, of the lightest liquid sample to be measured by the instrument.

$G_2$ = the density, in pounds per cubic foot, of the heaviest liquid sample to be measured by the instrument.

$G_2 - G_1 = \Delta G$ = the density range of the instrument.

$G_m$ = the density, in pounds per cubic foot, of mercury.

$G_s$ = the density, in pounds per cubic foot, of the immiscible sealing liquid 50.

$H$ = the total length, in feet, of the mercury float 11.

$h_1$ = the length, in feet, of the mercury float 11 submerged in mercury when the measuring float 19 is submerged in a liquid of density $G_1$.

$h_2$ = the length, in feet, of the mercury float 11 submerged in mercury when the measuring float 19 is submerged in a liquid of density $G_2$.

$h_2 - h_1$ = the effective travel, in feet, of the mercury level on the mercury float 11 as the density of the measured liquid changes from $G_2$ to $G_1$.

$L_1$ = the travel, in feet, of the measuring float 19.

$L_2$ = the travel, in feet, of the mercury float 11.

$V_1$ = the volume, in cubic feet, of the measuring float 19.

$V_2$ = the volume, in cubic feet, of the mercury float 11 submerged in mercury when $F_3$ is exerted by the measuring float 19.

$V_3$ = the volume, in cubic feet, of the mercury float 11 submerged in mercury when $F_3$ is exerted by the measuring float 19.

$V_4$ = the volume, in cubic feet, of the mercury float 11 submerged in the sealing liquid when $F_1$ is exerted by the measuring float 19.

$V_5$ = the volume, in cubic feet, of the mercury float 11 submerged in the sealing liquid when $F_3$ is exerted by the measuring float 19.

$W_1$ = the weight, in pounds, of the measuring float 19.
$W_2$ = the weight, in pounds, of the mercury float 11.

*Computations*

Since forces exerted by the measuring float must balance those exerted on the mercury float the following relations exist:

(a) When $F_1$ is exerted by the measuring float $$F_1 \times \frac{a}{b} = F_2 \times \frac{d}{c} \qquad (1)$$

and (b) when $F_3$ is exerted by the measuring float $$F_3 \times \frac{a}{b} = F_4 \times \frac{d}{c} \qquad (2)$$

Subtracting (1) and (2)

$$\frac{a}{b} \times (F_3 - F_1) = \frac{d}{c} \times (F_4 - F_2) \qquad (3)$$

Now $F_1 = V_1G_1 - W_1$ and $F_3 = V_1G_2 - W_1$
Also $F_2 = V_2G_m + V_4G_s - W_2$ and
$$F_4 = V_3G_m + V_5G_s - W_2$$

Substituting these values in (3)

$$\frac{a}{b} \times (V_1G_2 - W_1 - V_1G_1 + W_1) =$$
$$\frac{d}{c} \times (V_3G_m + V_5G_s - W_2 - V_2G_m - V_4G_s + W_2)$$

and simplifying $$\frac{a}{b} \times V_1 \times (G_2 - G_1) = \frac{d}{c} \times (V_3G_m + V_5G_s - V_2G_m - V_4G_s)$$

or $$\frac{a}{b} \times V_1 \times \Delta G = \frac{d}{c} \times [G_m(V_3 - V_2) + G_s(V_5 - V_4)] \qquad (4)$$

Volumes of various portions of the mercury float are as follows:

$$V_2 = \frac{\pi D^2}{4} \times h_1 \qquad V_3 = \frac{\pi D^2}{4} \times h_2$$
$$V_4 = \frac{\pi D^2}{4} \times (H - h_1) \qquad V_5 = \frac{\pi D^2}{4} \times (H - h_2)$$

Substituting these values in (4)

$$\frac{a}{b} \times V_1 \times \Delta G = \frac{d}{c}\left[G_m\left(\frac{\pi D^2}{4} \times h_2 - \frac{\pi D^2}{4} \times h_1\right) + G_s\left(\frac{\pi D^2}{4} \times (H - h_2) - \frac{\pi D^2}{4}(H - h_1)\right)\right]$$

and simplifying $$\frac{a}{b} \times V_1 \times \Delta G = \frac{d}{c} \times \frac{\pi D^2}{4}[G_m(h_2 - h_1) - G_s(h_2 - h_1)]$$

or $$\frac{a}{b} \times V_1 \times \Delta G = \frac{d}{c} \times \frac{\pi D^2}{4} \times (G_m - G_s) \times (h_2 - h_1) \qquad (5)$$

As the mercury float 11 moves through its full range of travel, the mercury level will change depending upon the relative diameters of the mercury float and the mercury chamber 6. These relations are expressed as follows:

$$\frac{\pi D^2}{4} \times L_2 = \frac{\pi D_1^2}{4} \times (h_2 - h_1 - L_2) - \frac{\pi D^2}{4}(h_2 - h_1 - L_2)$$

or $$D^2 L_2 = D_1^2(h_2 - h_1 - L_2) - D^2(h_2 - h_1 - L_2)$$

and $$D^2 L_2 + L_2(D_1^2 - D^2) = (h_2 - h_1)(D_1^2 - D^2) \qquad (6)$$

Expanding the left-hand side of (6) and simplifying $$D_1^2 L_2 = (h_2 - h_1)(D_1^2 - D^2)$$

or $$(h_2 - h_1) = \frac{D_1^2 L_2}{(D_1^2 - D^2)} \qquad (7)$$

The travel of the measuring and mercury floats are related by the following expressions:

$$L_1 = \frac{ca}{bd} \times L_2 \qquad \text{or} \qquad L_2 = \frac{bd}{ca} \times L_1$$

Substituting the latter value in (7)

$$(h_2 - h_1) = \frac{bd D_1^2 L_1}{ca(D_1^2 - D^2)} \qquad (8)$$

Substituting (8) in (5)

$$\frac{a}{b} \times V_1 \times \Delta G = \frac{d}{c} \times \frac{\pi D^2}{4} \times \frac{bd D_1^2 L_1}{ca(D_1^2 - D^2)} \times (G_m - G_s)$$

and simplifying $$\Delta G = \frac{b^2 d^2 \pi L_1 D^2 D_1^2}{4a^2c^2 V_1(D_1^2 - D^2)} \times (G_m - G_s) \qquad (9)$$

From Equation 9 it is possible to calculate the specific gravity measuring range of any instrument designed according to this invention after the following physical measurements have been determined:

(1) Lengths of the levers
(2) Allowable travel of the measuring float
(3) Volume of the measuring float
(4) Diameters of the mercury float and mercury chamber
(5) Density of the sealing liquid Likewise, it is possible to calculate any one required physical measurement for an instrument designed to measure a desired specific gravity range by substituting in the above equation arbitrarily selected values for the other physical dimensions.

It will be apparent that many changes in the configuration and arrangement of parts can be made without departing from the scope of the present invention. A wide variety of lever systems can be adapted to the apparatus described. The essential feature is that the moving system must be immersed in a sealing liquid of the character heretofore described.

The nature and objects of the present invention having been thus described and illustrated, what is claimed as new and useful and is desired to be secured by Letters Patent is:

1. In a device for continuously measuring the specific gravity of a flowing stream of liquid, a chamber having a portion adapted to retain a reference liquid, a float mounted to be partially immersed in said reference liquid, an inlet port on said chamber for the test liquid, the gravity of which is to be measured, an outlet port for said test liquid arranged so as to maintain a predetermined body of said test liquid in said chamber, a float arranged to be totally immersed in said test liquid, a lever system arranged within said chamber between said floats, said floats being connected to said lever system in opposition to each other, means for indicating the resultant of the motion of said lever system, and means for maintaining said lever system completely enveloped in a sealing liquid immiscible with said reference liquid and with said test liquid.

2. In a device for continuously measuring the specific gravity of a flowing stream of liquid, a chamber having a portion adapted to retain a reference liquid, a float mounted to be partially immersed in said reference liquid, an inlet port on said chamber for the test liquid, the gravity of which is to be measured, an outlet port for said test liquid arranged so as to maintain a pre-determined body of said test liquid in said chamber, a float arranged to be totally immersed in said test liquid, a lever system arranged between said inlet port for said test liquid and the portion of said chamber containing said reference liquid, said floats being connected to said lever system in opposition to each other, means for indicating the resultant of the motion of said lever system and ports arranged on said chamber between said inlet port for the test liquid and the portion of said chamber containing the reference liquid for the maintenance in said chamber of a layer of sealing liquid immiscible with said reference liquid and with said test liquid and of a thickness sufficient to envelop said lever system.

3. In a device for continuously measuring the specific gravity of a flowing stream of liquid, a chamber having a portion adapted to retain a reference liquid, a float mounted to be partially immersed in said reference liquid, an inlet port on said chamber for the test liquid, the gravity of which is to be measured, an outlet port for said test liquid arranged so as to maintain a pre-determined body of said test liquid in said chamber, a float arranged to be totally immersed in said test liquid, a lever system arranged within said chamber between said floats, said floats being connected to said lever system in opposition to each other, means for transmitting the resultant of the motion of the lever system to the exterior of said chamber and means for maintaining said lever system completely enveloped in a sealing liquid immiscible with said reference liquid and with said test liquid.

4. In a device for continuously measuring the specific gravity of a flowing stream of liquid, a chamber having a portion adapted to retain a reference liquid, a float mounted to be partially immersed in said reference liquid, an inlet port on said chamber for the test liquid, the gravity of which is to be measured, an outlet port for said test liquid arranged so as to maintain a pre-determined body of said test liquid in said chamber, a float arranged to be totally immersed in said test liquid, a lever system arranged between said inlet port for said test liquid and the portion of said chamber containing said reference liquid, said floats being connected to said lever system in opposition to each other, means for transmitting the resultant of the motion of the lever system to the exterior of said chamber and ports arranged on said chamber between said inlet port for the test liquid and the portion of said chamber containing the reference liquid for the maintenance in said chamber of a layer of sealing liquid immiscible with said reference liquid and with said test liquid and of a thickness sufficient to envelop said lever system.

5. In a device for continuously measuring the specific gravity of a flowing stream of liquid, a chamber, a separate receptacle adapted to hold a reference liquid arranged in said chamber, a float mounted to be partially immersed in said reference liquid, an inlet port on said chamber for the test liquid, the gravity of which is to be measured, an outlet port for said test liquid arranged so as to maintain a pre-determined body of said test liquid in said chamber, a float arranged to be totally immersed in said test liquid, a lever system arranged out of contact with said test liquid between said floats, said floats being connected to said lever system in opposition to each other, means for transmitting the resultant of the motion of the lever system to the exterior of said chamber and a sealing liquid immiscible with said reference liquid and with said test liquid completely enveloping said lever system.

6. In a device for continuously measuring the specific gravity of a flowing stream of liquid, a chamber, a separate receptacle adapted to hold a reference liquid arranged in the lower end of said chamber, a float mounted to be partially immersed in said reference liquid, a body of lighter liquid maintained in the lower portion of said chamber, said liquid being immiscible with the reference liquid and with the test liquid the gravity of which is to be measured and heavier than the latter, a system of levers completely immersed in said body of liquid, means for transmitting the resultant of the motion of such system of levers to the exterior of said chamber, an inlet port for the test liquid on said chamber at a point above the level of said body of liquid, an outlet port for said test liquid arranged so as to maintain the upper portion of said chamber full of said test liquid, a float arranged to be totally immersed in said test liquid in the upper part of said chamber, and means connecting the two floats to said lever system in opposition to each other.

7. In a device for continuously measuring the specific gravity of a flowing stream of liquid, a chamber having a portion adapted to retain a reference liquid, a first float mounted to be partially immersed in said reference liquid, an inlet port on the chamber for the test liquid the gravity of which is to be measured, an outlet port for said test liquid arranged so as to maintain a pre-determined body of said test liquid in said chamber, a second float vertically spaced from the first float and arranged to be totally immersed in said test liquid, a lever system arranged within said chamber between said floats, and means for maintaining said lever system completely enveloped in a sealing liquid immiscible with said reference liquid and with said test liquid, said floats being connected to said lever system in opposition to each other and means for indicating the resultant motion of said lever system.

JOHN R. MARTIN.
FORREST B. BURRELL.

REFERENCES CITED

The following references are of record in the file of this patent:

UNITED STATES PATENTS

| Number | Name | Date |
| --- | --- | --- |
| 1,424,403 | Hartman et al. | Aug. 1, 1922 |
| 1,450,023 | Edelman | Mar. 27, 1923 |
| 1,546,702 | Bailey | July 21, 1925 |
| 1,604,387 | Caldwell | Oct. 26, 1926 |
| 1,800,532 | Howard | Apr. 14, 1931 |
| 2,248,322 | Annin | July 8, 1941 |
| 2,251,771 | Wynn et al. | Aug. 5, 1941 |
| 2,279,254 | Irwin | Apr. 7, 1942 |

FOREIGN PATENTS

| Number | Country | Date |
| --- | --- | --- |
| 66,271 | Germany | Dec. 20, 1892 |
| 184,789 | Great Britain | Apr. 12, 1923 |